May 1, 1945.  A. L. RUMMELSBURG  2,374,957
METHOD FOR BORON FLUORIDE RECOVERY
Filed Feb. 13, 1942
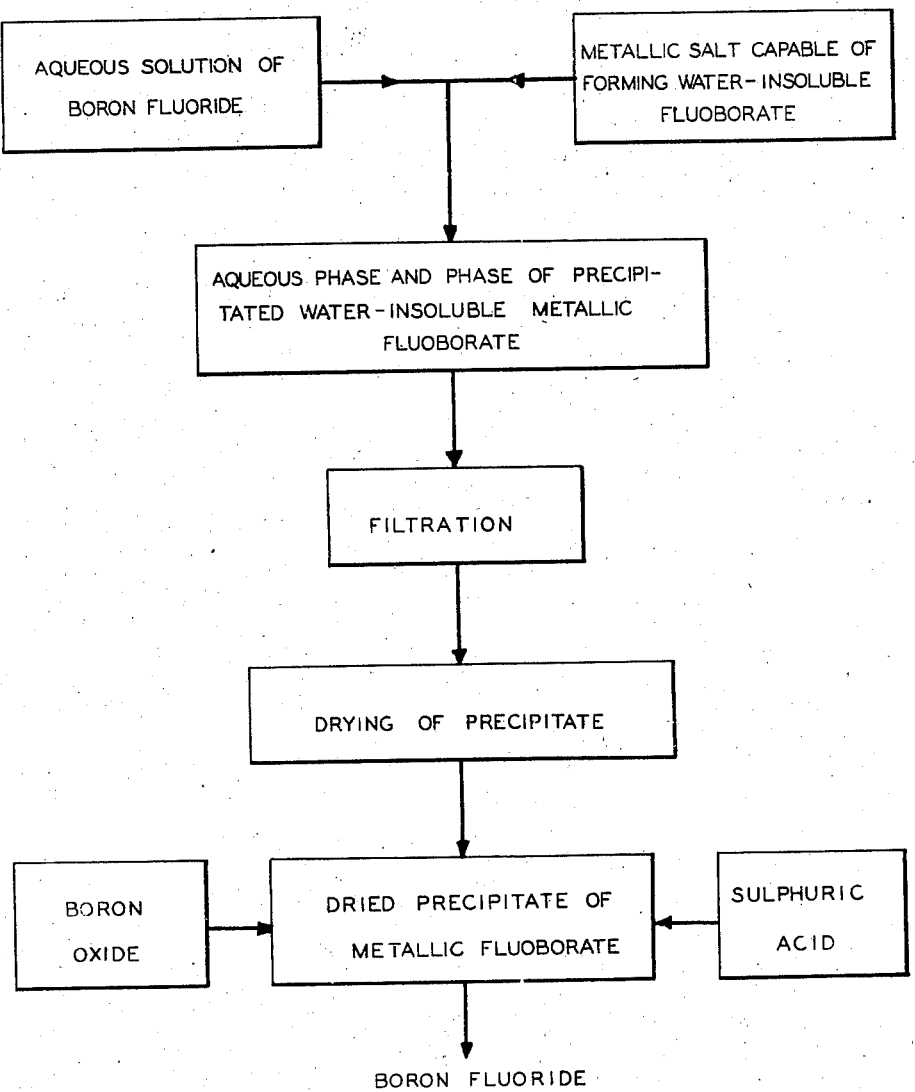
Alfred L. Rummelsburg
INVENTOR.
BY
ATTORNEY Patented May 1, 1945

2,374,957

UNITED STATES PATENT OFFICE 2,374,957

METHOD FOR BORON FLUORIDE RECOVERY

Alfred L. Rummelsburg, Wilmington, Del., assignor to Hercules Powder Company, Wilmington, Del., a corporation of Delaware Application February 13, 1942, Serial No. 430,745

5 Claims. (Cl. 23—205)

This invention relates to the recovery of boron fluoride, and more particularly to the recovery of boron fluoride from aqueous solution containing the same.

Boron fluoride finds important use as a polymerization catalyst for organic substances, and in particular for rosins and rosin esters.

For example, a method is well known for the polymerization of rosins and rosin esters by dissolving the rosin or rosin ester in a suitable inert organic solvent and then treating the solution with boron fluoride. This process requires that the boron fluoride be removed from the solution after polymerization has been accomplished as far as desired, and this removal is usually performed by water washing the solution which contains the polymerized and unpolymerized rosins or rosin esters with cold, or preferably, hot water. In order to produce a more efficient boron fluoride catalytic polymerization process and to reduce the catalyst cost, it is necessary to provide means for the recovery of the boron fluoride catalyst from the wash water.

Now, in accordance with this invention, boron fluoride is recovered from aqueous solution by adding to the solution a compound capable of forming a water-insoluble salt of fluoboric acid. The insoluble precipitate is separated from the solution by any suitable means, such as filtration, and then dried. Gaseous boron fluoride can be recovered by reacting the dried salt with sulfuric acid and boron oxide. A flow sheet of this process for boron fluoride recovery is contained in the self-explanatory drawing.

The following examples illustrate specifically the method of this invention for recovering boron fluoride from an aqueous solution containing the same. In the examples, parts are expressed in weight units, unless otherwise indicated.

Example I

An aqueous solution of boron fluoride (produced by washing a polymerization mixture containing 48 parts of boron fluoride, 600 parts of I wood rosin, and 900 parts of benzene with 2000 parts of water) was treated with a solution of 82.2 parts of potassium chloride dissolved in 350 parts of water and the mixture was stirred. The solution was allowed to stand at room temperature for six hours, and the precipitate of potassium fluoborate removed by filtration. The precipitate was washed with four 100 part portions of water at 10° C., and dried over phosphorus pentoxide, giving a yield of 53 parts of potassium fluoborate. An additional quantity of 6 parts of potassium fluoborate was obtained by allowing the potassium chloride treated wash solution to stand for three days at room temperature.

Example II

An aqueous solution of boron fluoride was produced as in Example I by washing a rosin-polymerization mixture with water at a temperature of 55° C., and the washed solution was permitted to stand at room temperature for a period of about 24 hours. 75 parts of rubidium sulfate was then added to the wash water, and the solution was chilled to a temperature of 3° C. for a period of about eight hours with agitation. The precipitate of rubidium fluoborate was filtered off, washed with 100 parts of water at 3° C., and dried under reduced pressure, yielding 88 parts of rubidium fluoborate (98% of the theoretical yield).

Example III

An aqueous solution of boron fluoride was produced as in Example II, and 82 parts of anhydrous potassium carbonate was added with agitation at a temperature of 48° C. The solution was then cooled to a temperature of 3° C. for a period of eight hours with agitation. The precipitate of potassium fluoborate was filtered off, washed with 100 parts of water at 3° C., and then dried, giving a yield of 63 parts of potassium fluoborate (95% of the theoretical yield).

Example IV

To an aqueous solution of boron fluoride produced as in Example II was added 162 parts of cesium hydroxide. The solution was then cooled and agitated at a temperature of 3° C. for a period of about eight hours. The precipitate of cesium fluoborate was then filtered off, washed with 100 parts of water at 3° C., and then dried, giving a yield of 118 parts of cesium fluoborate (95% of the theoretical yield).

The above examples illustrate that the method of this invention for the recovery of boron fluoride from aqueous solution comprises adding to the solution a compound which will form an insoluble salt of fluoboric acid. The salt is then separated from the solution, dried, and the boron fluoride recovered by reacting the salt with boron oxide and sulfuric acid.

The aqueous solution was obtained by water washing a rosin polymerization mixture in which boron fluoride was used as a polymerization catalyst, but the source of the aqueous solution is immaterial insofar as the application of the method of this invention is concerned. The polymerization mixture may be washed with cold or hot water according to the method of this invention, the range from about 50 to about 100° C. being preferred. Satisfactory washing usually can be obtained by employing a weight of wash water equal to the weight of boron fluoride in the reaction mixture, but preferably at least about ten times that amount of wash water should be used to obtain satisfactory contacting. The upper limit of the ratio of wash water to boron fluoride will depend upon feasibility.

In place of the potassium chloride, rubidium sulfate, potassium carbonate, and cesium hydroxide used in the examples, any other compound may be used which will form an insoluble salt of fluoboric acid. For example, the potassium, rubidium, and cesium salts of hydrochloric, nitric, and sulfuric acids are all suitable precipitating agents. Precipitation may be accomplished less preferably by the use of the hydroxides or carbonates of potassium, rubidium, or cesium. In the precipitation, it is preferable to use an excess of the precipitating salt and to precipitate at reduced temperatures, in order to produce the maximum yield of salt of fluoboric acid. Preferably, the boron fluoride should comprise between about 0.5% and about 15% by weight of the aqueous solution. The rate of crystallization may be increased by agitation, or by a combination of seeding and agitation.

Boron fluoride may be recovered from the precipitated salt of fluoboric acid by any of the procedures known in the art, such as, for example, by reaction of the precipitate with about six moles of boron oxide per mole of precipitate in the presence of an excess of sulfuric acid.

Where the potassium, rubidium, or cesium salt of hydrochloric, sulfuric, or nitric acid has been used as a precipitating agent, boron oxide may be obtained by concentrating the solution by partial evaporation after the precipitate of insoluble salt of fluoborate acid has been separated, allowing boric acid to crystallize out, and then fusing the recovered boric acid at red heat to decompose the boric acid and form boron oxide. This boron oxide may be used in the regeneration step of the preceding paragraph.

The method of this invention is useful in the recovery of boron fluoride from aqueous solutions, which are obtained from polymerization mixtures of rosins or rosin esters or from any other source.

When the process of this invention is employed, substantially all of the fluorine and about 75% of the original boron may be recovered from aqueous solution. The process of this invention is valuable in improving the efficiency and in reducing catalyst costs in the numerous processes in which boron fluoride finds use as a catalyst.

What I claim and desire to protect by Letters Patent is:

1. A process for the recovery of boron fluoride from polymerization mixtures of boron fluoride and a material selected from the group consisting of rosins and rosin esters which comprises washing the said polymerization mixture with water, contacting the wash water with a salt of a strong mineral acid and a metal selected from the group consisting of potassium, rubidium and cesium under such conditions that the insoluble metal fluoborate of said metal is formed and precipitated, separating and drying the precipitate so formed, and reacting the precipitate in admixture with boron oxide and sulfuric acid, whereby the boron fluoride is recovered.

2. A process for the recovery of boron fluoride from polymerization mixtures of boron fluoride and a material selected from the group consisting of rosins and rosin esters which comprises washing the said polymerization mixture with water, contacting the wash water with potassium sulfate under such conditions that potassium fluoborate is formed and precipitated, separating and drying the precipitate so formed, and reacting the said precipitate in admixture with boron oxide and sulfuric acid, whereby the boron fluoride is recovered.

3. A process for the recovery of boron fluoride from polymerization mixtures of boron fluoride and a material selected from the group consisting of rosins and rosin esters which comprises washing the said polymerization mixture with water, contacting the wash water with potassium nitrate under such conditions that potassium fluoborate is formed and precipitated, separating and drying the precipitate so formed, and reacting the said precipitate in admixture with boron oxide and sulfuric acid, whereby the boron fluoride is recovered.

4. A process for the recovery of boron fluoride from polymerization mixtures of boron fluoride and a material selected from the group consisting of rosins and rosin esters which comprises washing the said polymerization mixture with water, contacting the wash water with a compound of a metal selected from the group consisting of potassium, rubidium and cesium capable of forming the fluoborate of the said metal under such conditions that the insoluble fluoborate of said metal is formed and precipitated, separating and drying the precipitate so formed, and reacting the precipitate in admixture with boron oxide and sulfuric acid, whereby the boron fluoride is recovered.

5. A process for the recovery of boron fluoride from polymerization mixtures of boron fluoride and a material selected from the group consisting of rosins and rosin esters which comprises washing the said polymerization mixture with water, contacting the wash water with a metal compound selected from the group consisting of hydroxides, carbonates and strong mineral acid salts of a metal selected from the group consisting of potassium, rubidium and cesium under such conditions that the insoluble fluoborate of said metal is formed and precipitated, separating and drying the precipitate so formed and reacting the precipitate in admixture with boron oxide and sulfuric acid, whereby the boron fluoride is recovered.

ALFRED L. RUMMELSBURG.